March 21, 1967  S. ARONOFF  3,310,693
MAGNETIC COUPLING
Filed Feb. 4, 1964  2 Sheets-Sheet 1

SAMUEL ARONOFF
INVENTOR.

BY White & Haefliger

ATTORNEYS.

March 21, 1967  S. ARONOFF  3,310,693
MAGNETIC COUPLING
Filed Feb. 4, 1964  2 Sheets-Sheet 2
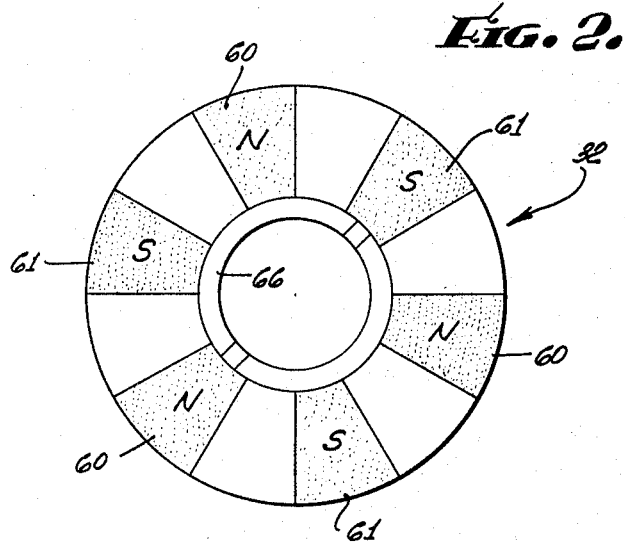
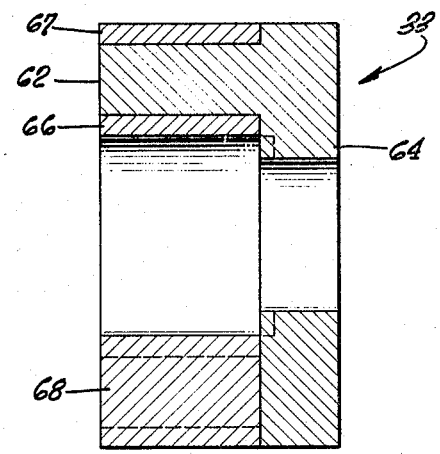
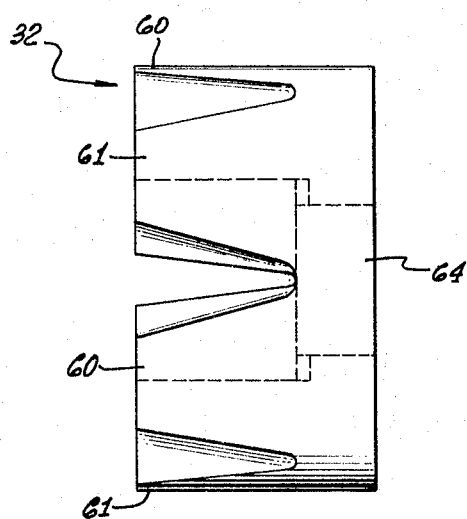
SAMUEL ARONOFF
INVENTOR.
BY White & Haefliger
ATTORNEYS.

United States Patent Office 3,310,693
Patented Mar. 21, 1967

3,310,693
MAGNETIC COUPLING
Samuel Aronoff, Los Angeles, Calif., assignor to Gray & Huleguard, Inc., Santa Monica, Calif., a corporation of California
Filed Feb. 4, 1964, Ser. No. 342,376
5 Claims. (Cl. 310—104)

This invention relates generally to magnetic type couplings, and more particularly concerns apparatus for effecting transmission of rotary drive from one side of a partition structure to the opposite or outer side of the partition.

The problem solved by the present invention typically occurs when it is desired to transmit the drive of an electric motor to a driven shaft, while maintaining the motor within a controlled atmosphere. For example, it may be desired to maintain the motor operating within a gaseous atmosphere above a predetermined pressure where brush commutation or switching would suffer, as by excessive arcing, if the pressure dropped below acceptable levels. However, if the motor or the switches are to operate satisfactorily at high altitudes it becomes necessary to enclose them within controlled atmospheres chambers, giving rise to the problem of how to transmit the motor drive from the chamber interior to the exterior, without creating atmosphere leakage problems.

One approach to a solution to the problem consists in providing magnetic coupling characterized in that a driving unit rotated by the motor in the chamber is magnetically coupled to a driven unit outside the chamber; however, effective magnetic coupling between the units necessitates locating them in closely spaced relation whereby the partition structure separating them becomes so thin that it deflects in response to changes in the differential pressure applied to opposite sides of the partition. Such deflection leads to unwanted rubbing or braking contact of one or both of the magnetic coupling units with the partition, interfering with the rotary drive transmission.

The above problems and others associated with this type apparatus are solved by the present invention, and with unusual results characterized in that highly effective magnetic coupling between the driving and driven units may be obtained without interference contact with the deflecting diaphragm or partition structure separating the units. Thus, in accordance with the invention, the units are made endwise movable together along their common axis of rotation in response to deflection of the partition, and the units are furthermore supported to rotate in sufficiently closely approaching relation to opposite faces of the partition that one unit rotates in response to rotation of the other, to drive a load, while braking or rubbing contact of the units with the partition structure is prevented over the range of deflection positions of the partition.

More specifically, the partition structure typically comprises part of an hermetically sealed controlled atmosphere chamber containing the electric motor and the driving unit of the coupling, the driven unit being outside the chamber to transmit rotation to a load. Also, a pair of axial thrust bodies are carried by the partition structure at opposite sides thereof to receive application of axial force transmitted by a pair of shafts respectively carrying the magnetically attractive coupling units, the shafts being made axially movable endwise with the partition to shift the coupling units axially when the partition deflects and thereby keep the units out of rubbing contact with the partition. In this regard, the shafts are pulled toward the partition by the magnetically attracted coupling units, and are typically provided with bearing terminals in contact with the thrust bodies at the axis, the shafts themselves being supported by centering bearings allowing endwise movement thereof simultaneously with partition deflection. As will appear, the above structure accomplishes the functions and objects of the invention in a highly advantageous and unusual manner.

Another object of the invention concerns the provision of a driven coupling unit provided with poles and electrically conductive structure for preventing rapid and complete slippage of the drive at critical loading.

These and other objects and advantages of the invention, as well as the details of an illustrative embodiment, will be more fully understood from the following detailed description of the drawings, in which:

FIG. 2 is an end view of a driving magnetic coupling unit, which is not equipped with an anti-slippage winding, it being possible to form the driven unit like this driving unit;

FIG. 3 is a section taken through the driven coupling unit of FIG. 1; and

FIG. 4 is a side view of the magnetic coupling unit of FIG. 2.

Figure 1:
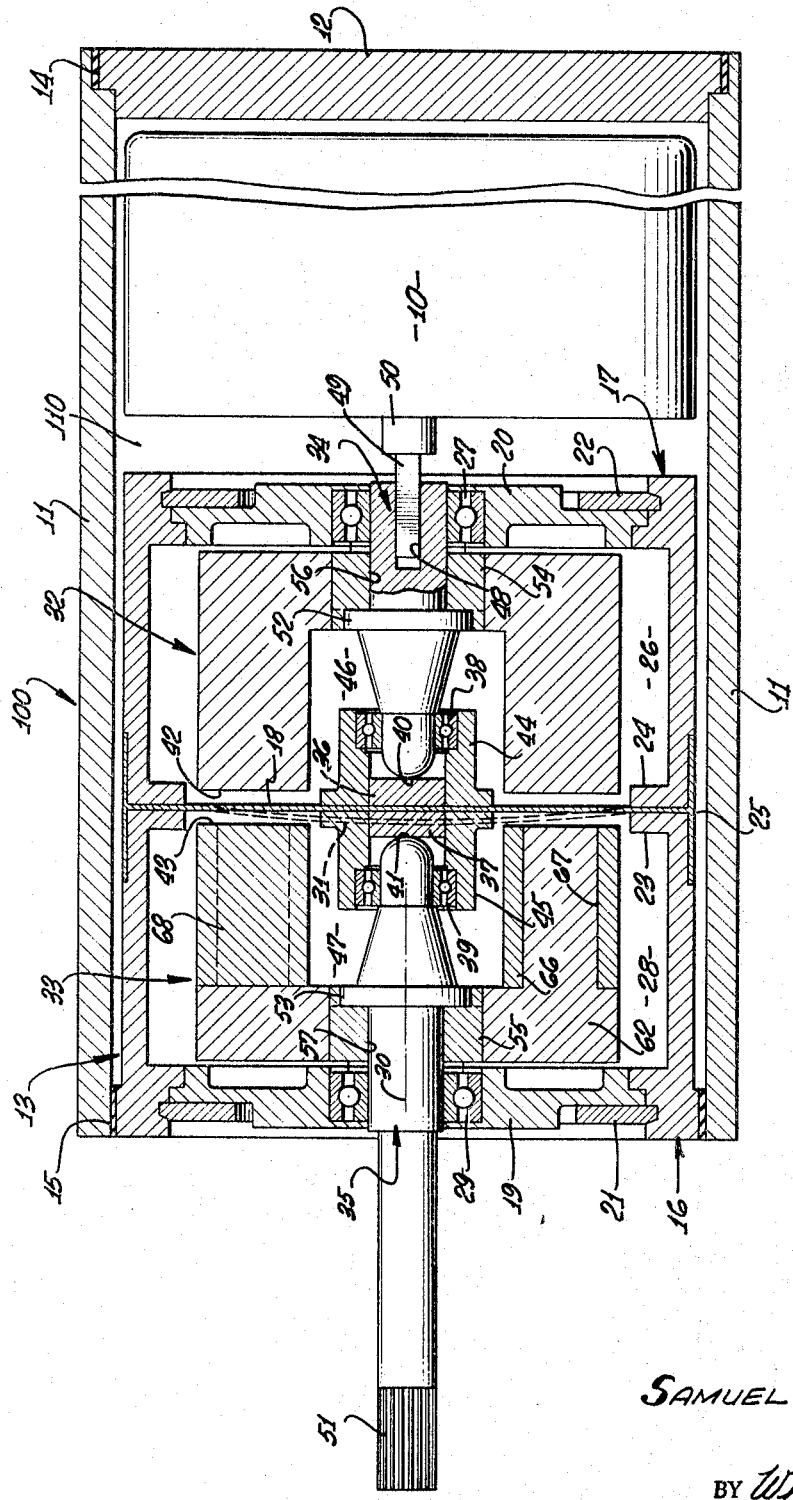
FIG. 1 is a side elevation in section showing details of the improved coupling assembly.

In the drawings an electric motor is generally indicated at 10 as being contained within a chambered structure 100 typically including a housing 11 closed at its opposite ends by cap 12 and housing structure 13. Annular seals are provided at 14 and 15 respectively between the housing 11 and cap 12, and between the housing 11 and structure 13 in order to retain the gas within the housing interior 110 at controlled pressure best suited to operation of the motor, any motor brushes and any electrical switches.

The structure 13 is itself chambered in the form of the invention illustrated, and includes re-entrant sub-chambers 16 and 17 with a common partition 18 separating them. While the sub-chambers are shown typically to include end plates 19 and 20 held in place by retaining rings 21 and 22, the partition 18 being typically held in sealing attachment to the proximate end portions 23 and 24 of the sub-chamber, as by brazing, equivalents of this particular design may be used. For example, the sub-chambers 16 and 17 may be formed by one housing structure. In the example, a retaining ring 25 encircles portions 23 and 24 and is attached thereto as by brazing. Accordingly, the interior 26 of sub-chamber 17 typically communicates through a centering bearing 27 with the housing interior 100, but is sealed off from the interior 28 of the sub-chamber 16, the latter communicating through a centering bearing 29 with the exterior. Since the atmosphere within the interiors 110 and 26 is at controlled pressure (say for example nitrogen gas at sea level pressure) the thin plate-like partition or diaphragm 18 will deflect leftwardly in the direction of axis 30 to a broken line position indicated at 31 when the exterior pressure drops as during a flight to high altitude.

In accordance with the invention, means is provided for effecting transmission of rotary drive from one side of the partition 18 to the other and in different deflection positions of the partition. Such means typically includes a pair of independently rotatable magnetically attracting units, as for example the units 32 and 33, which are movable together endwise along the axis 30 at opposite sides of the partition 18 and in response to deflection thereof. Also, the units are supported to rotate in sufficiently closely approaching relation to opposite faces of the partition 18 that one unit 33 rotates in response to rotation of the other unit 32 while braking contact of the units with the partition 18 is prevented in said different deflection positions of the partition.

The means including the partition 18 supported to deflect as described, and the means for effecting rotary drive from one side of the deflecting partition to the other may typically include axial thrust transmitting driving and driven shafts 34 and 35 respectively carrying the units 32 and 33, as well as thrust bodies 36 and 37 carried by the partition 18 at opposite sides thereof to receive axial force transmitted by the shafts. In this regard it will be understood that the shafts are movable axially endwise with the partition structure, and may be centered by the bearings 27 and 29 as well as by bearings 38 and 39, all of which accommodate endwise bodily movement of the shafts. Also, the shafts typically have thrust transmitting bearing terminals 40 and 41 in contact with the thrust bodies 36 and 37 at spaced locations along the axis 30, whereby the close spacing of the attracting units 32 and 33 is maintained without braking or rubbing contact of their end surfaces 42 and 43 with the partition 18.

As further seen in the drawing, the thrust bodies 36 and 37, centering bearings 38 and 39, and bearing supports or sleeves 44 and 45 braze connected to the partition are located within the respective coaxial recesses 46 and 47 formed by the attracting cup-shaped units 32 and 33. Also, the shaft 34 is axially slotted at 48 to receive a projection 49 on the motor shaft 50 allowing endwise displacement of the shaft 34 relative to the motor shaft without interrupting rotary drive transmission. Driven shaft 35 is shown fitted with a gear 51 outside end plate 19, for driving external equipment. Shafts 34 and 35 typically have pin connection to their respective units 32 and 33 at locations 52 and 53, and typically machinable steel inserts 54 and 55 are cast into the relatively non-machinable units 32 and 33 and bored at 56 and 57 to closely fit the shafts. Alternatively, the units 32 and 33 may be cast to fit the shafts 34 and 35, whereby the inserts 54 and 55 are then not needed.

The unit 32 is better seen in FIGS. 2 and 4 to typically comprise permanent magnets, such as Alnico, having multiple circularly spaced and alternating north and south poles indicated at 60 and 61. Thus, the driving unit 32 may have three north poles and three south poles in the form of projections from a base 64, and while six pole coupling magnets are shown, other numbers of pole pairs may be used. The driven unit 33 may have similar construction with poles projecting from base, or as seen in FIG. 3, the driven unit may have concentric inner and outer conductor rings 66 and 67 located inwardly and outwardly of its alternate north and south poles 62 and joined by conductive webs 68 filling the spaces between the poles. The structure 66–68 provides an electrically conductive "squirrel cage" having the effect of preventing rapid and complete slippage of the drive at higher torque transmission levels. In other words, the slip of driven magnet 33 will inccrease slowly rather than sharply under excessive loading. Also, the slippage will extend the "pulling" ability of the coupling beyond the point where a sharp "pull-out" will occur when the "squirrel-cage" windings are not used.

I claim:
1. In a coupling assembly
   first means including a hermetically sealed chamber including partition structure peripherally supported to deflect along a central axis generally normal to the plane of the partition in response to differential pressure changes as respects fluid pressure exertion at the inner and outer sides of the partition,
   second means for effecting transmission of rotary drive from the interior of said chamber at the inner side of said partition to the outside of the chamber at the outer side of the partition and in different deflection positions of the partition,
   a pair of independently rotatable magnetically attracting units in said second means movable together endwise along said axis at opposite sides of the partition and in response to deflection thereof,
   said units being supported to rotate in sufficiently closely approaching relation to opposite faces of the partition that one unit rotates in response to rotation of the other while braking contact of said units with the partition structure is prevented in said different deflection positions,
   said magnetically attracting units being generally cup-shaped and having multiple magnetic poles spaced about said axis and projecting toward the partition structure, and
   concentric conductor rings in said driven unit located inwardly and outwardly of said poles and conductive material joining said rings and extending in the spaces between said poles.
2. A coupling assembly including the combination of
   thin partition separating two chambers containing two different pressures, said partition being effective to hermetically retain said pressure and being deflectable in a direction generally normal to the plane thereof in response to the pressure differential across the partition,
   bearing means secured to the opposite sides of said partition for movement with the partition,
   a shaft in each of said chambers, each of said shafts having one end thereof rotatably supported in the respective bearing means, each of said shafts being axially moveable with the partition and the bearing means,
   a magnetic rotor mounted on each of said shafts for rotation therewith, each of said rotors having a face disposed adjacent to the partition, said faces being magnetized whereby the magnetic flux field extends through the partition and couples the magnetic rotors together for transferring torque therebetween,
   said rotors being axially moveable with the bearing means and the shafts whereby the spacing between the faces of the rotor and the partition remain constant.
3. A coupling assembly including the combination of
   a thin partition separating two chambers containing two different pressures, said partition being effective to hermetically retain said pressure in said chamber and being deflectable in a direction generally normal to the plane thereof in response to the pressure differential across the partition,
   bearing means secured to the opposite sides of said partition for movement axially of the housing with the partition,
   a drive shaft and a driven shaft in said chambers, said shafts extending axially of the housing and being free to move axially of their respective chambers,
   thrust means in said bearing means secured to the ends of said shafts for moving said shafts axially of the housing with the deflections of said partition,
   a magnetic rotor mounted on the drive shaft for rotation therewith and moveable axially with the shaft, said rotor having a face disposed adjacent the partition and separated therefrom by a uniform space, and
   a second magnetic rotor mounted on the driven shaft for rotation therewith and moveable axially with the shaft, said rotor having a face disposed adjacent the partition, the faces of said rotors being substantially concentric with each other whereby rotation of the first magnetic rotor by the drive shaft will create a torque on the second magnetic rotor.
4. A coupling assembly including the combination of
   a housing,
   a thin partition dividing said housing into two separated chambers and hermetically sealing said chambers for containing a pressure differential between said chambers, said partition being deflectable along an axis generally normal to the plane thereof in response to said pressure differential,
   first bearing means secured to one side of said parti- tion in the first chamber for movement axially of the housing with the partition, a drive shaft disposed in the first chamber and extending axially of the housing, a support in the first chamber rotatably carrying the drive shaft, said support allowing said shaft to move axially of the housing, said shaft having one end secured to said bearing means for movement axially of the housing with the deflections of the partition and bearing means, a magnetic rotor mounted on the drive shaft for rotation therewith, said rotor having a face disposed adjacent the partition and being moveable axially with the drive shaft whereby the face is maintained uniformly spaced from the partition, second bearing means secured to the opposite side of the partition in the second chamber for movement axially of the housing with said partition, a driven shaft disposed in said second chamber and extending axially of the housing, a support in the second chamber rotatably carrying the driven shaft, said support allowing said shaft to move axially of the housing, said driven shaft having one end secured to said bearing means for movement axially with the deflections of the partition and bearing means, and a second magnetic rotor mounted on the driven shaft for rotation therewith, said rotor having a face disposed on the opposite side of the partition from the first face and concentric therewith, said second rotor being moveable axially with the driven shaft whereby the spacing between the second face and said partition remains constant, said faces being sufficiently closely spaced to each other whereby rotation of the first magnetic rotor by the drive shaft will create a torque on the second magnetic rotor.

5. The combination of claim 4 including a drive motor mounted in said first chamber and coupled to the drive shaft, said drive shaft being free to move axially relative to the housing and motor and with the partition.

References Cited by the Examiner

UNITED STATES PATENTS 2,779,513   5/1956   Dickey.

MILTON O. HIRSHFIELD, *Primary Examiner.*

D. X. SLINEY, *Assistant Examiner.*